United States Patent Office 2,913,369
Patented Nov. 17, 1959

2,913,369
FUNGICIDE

John H. Haslam, Landenberg, Pa., assignor to E. I. du Pont de Nemours and Company, Wilmington, Del., a corporation of Delaware No Drawing. Application July 5, 1955
Serial No. 520,134

17 Claims. (Cl. 167—30)

This invention pertains to compositions suitable for preserving organic materials subject to fungal deterioration. This application is a continuation-in-part of my co-pending application Serial No. 520,135, filed July 5, 1955.

It is known that certain halogenated phenols, such as pentachlorophenol, may be used as fungicides for wood and other cellulosic materials. These compounds are, however, rather malodorous, only slightly soluble in common hydrocarbon solvents, irritating to the skin, and far too phytotoxic to be used on living plants or trees. Pentachlorophenol-treated wood in contact with soil or weather has only limited protection due to the fact that this reagent is leached out by water.

It has now been found that halogenated phenols, halogenated naphthols and halogenated aromatic alcohols may be reacted with alkoxy polytitanyl acylates or alkoxy polyzirconyl acylates to form valuable fungicides possessing superior water-repellent properties.

It is, therefore, an object of this invention to provide novel compositions which prevent the harmful deterioration of organic materials by fungus growth. Materials which may be subject to such deterioration and which are within the scope of this invention include wood, cotton, cordage, canvas, sponge, twine, burlap, leather, and the like, as well as living plants. Another object is to provide a novel process for protecting these organic materials from the aforementioned deterioration.

The active ingredients in my fungicidal compositions are selected from the group consisting of halogenated phenoxy polytitanyl acylates, halogenated naphthoxy polytitanyl acylates, halogenated aralkoxy polytitanyl acylates, and the corresponding polyzirconyl acylates and mixtures of the above compounds. These materials may be prepared by reacting an alkoxy polyzirconyl acylate, or an alkoxy polytitanyl acylate; such as, isopropoxy polytitanyl stearate which is usually represented by the unit formula

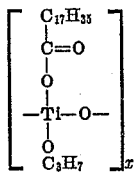

with a hydroxy compound selected from the group consisting of halophenols, halonaphthols, and halogenated aromatic alcohols. In this reaction the isopropoxy radical is replaced by the halophenoxy, halonaphthoxy or the halogenated aralkoxy group, and isopropanol is formed as a co-product alcohol. The reaction may be illustrated as follows:

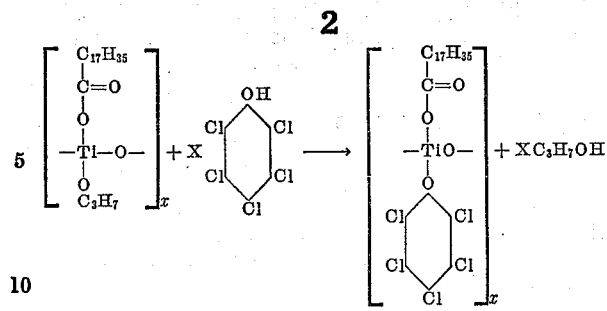

This alcoholysis is an equilibrium reaction which is forced to completion in the desired direction by removal of the isopropanol.

Methods for preparing the alkoxy polytitanyl acylates and the corresponding zirconium compounds which are the initial starting materials for the above reaction are disclosed in U.S. Patents 2,621,193, 2,621,195, 2,666,772 and in U.S. application Serial No. 407,609, filed February 1, 1954, now abandoned. The halogenated hydroxy compounds which may be reacted with the aforementioned acylates include p-fluorophenol, p-chlorophenol, p-tri fluoromethyl phenol, pentachlorophenol, 4-chloro-m-cresol, 5-chloro-o-cresol, 2,4-dichloro-1-naphthol, 1-chloro-2-naphthol, 1,6-dibromo-2-naphthol, p-chlorobenzyl alcohol, a-(chloromethyl) benzyl alcohol, trichloromethyl phenol, p-chlorophenyl-ethyl alcohol, chloromethyl tetrachlorophenol, p-chlorothymol, trichlorophenol, 2,4,6-trichloro-3-methyl phenol, chloro-m-xylol, chloroesorcinol, and chlorocarvacrol. The halogens including fluorine, chlorine, bromine, and iodine, may be substituted in any position; however, it is preferred that they are located primarily on the aromatic nuclei.

The reacting proportions for preparing the fungicides of this invention range from 0.1 mol to 1.9 mols of the halogenated hydroxy compound for each metal atom in the starting acylate. A preferred range is 0.5 to 1 mol of the halogenated hydroxy compound. The reaction proceeds without special conditions, the critical step being the removal of the co-product alcohol so that the reaction may go to completion.

The simplest manner by which the product of this invention may be represented is in terms of the following chemical unit.

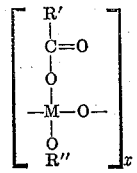

in which M is Ti or Zr, and

is an acylate group derived from an organic carboxylic acid having from 4–22 carbon atoms and RO″— is an organo radical selected from the group consisting of halophenoxy, halonaphthoxy and halogenated aralkoxy radicals. Since it is not possible to give an empirical representation of the complete molecule, the compound is described in terms of the number of acylate and R″O— radicals per metal atom of the $$-\underset{|}{\overset{|}{M}}-O-$$

chains which repeat to form linear, branched and cyclic structures and combinations of the same. The products of this invention contain from about 0.1 to 1.9 acylate groups per Ti or Zr atom with a preferred range being about 0.5 to 1. The acylate groups are derived from organic carboxylic acids, preferably the monocarboxylic acids having from 4–22 carbon atoms. Examples of these acids are butyric, acrylic, lauric, stearic, oleic, linoleic and the like; substituted fatty acids such as ricinoleic and phenyl stearic acid; aryl carboxylic acids such as benzoic and cinnamic; and the natural mixtures of acids derived from animal fat, fish oil, tall oil, linseed oil, soybean oil and cocoanut oil. The $$R\overset{\|}{\underset{}{O}}-$$

groups, which are derived from the halogenated hydroxy compounds by removal of the hydrogen from the hydroxyl group, are present in amounts ranging from 0.1 to 1.9 per Ti or Zr atom with 0.5 to 1 being preferred. It is also possible to have a residue of hydroxyl or alkoxy groups or both connected to the Ti or Zr atoms in place of some of the halogenated groups. The alkoxy groups which may be present are those of the alkoxy polytitanyl acylate, or the corresponding zirconium compound, used in the preparatory reaction. Said alkoxy groups are present only when the preparatory reaction does not have a sufficient amount of halogenated hydroxy compound to replace all the alkoxy groups on the starting material. The hydroxyl groups which may be present are a result of using a partially hydrolyzed alkoxy polytitanyl acylate, or its zirconium analog, as the starting material, and they are not replaced during the reaction. These hydroxyl or alkoxy groups constitute the residue of the molecule, and they complete the molecule when the number of halogenated groups and acylate groups, within the recited limits, are insufficient to satisfy the tetravalency of the Ti or Zr atoms and make the structure complete.

Representative examples of effective fungicidal agents include 4 chloro-2-methylphenoxy polytitanyl stearate with a 1 to 1 ratio of stearate and 4 chloro-2-methylphenoxy groups; a 2,4,6 tribromophenoxy polytitanyl laurate with a 1 to 0.5 ratio of laurate and 2,4,6 tribromophenoxy groups and a residue of 0.5 isopropoxy groups; pentachlorophenoxy polyzirconyl oleate with a 1 to 1 ratio of oleate and pentachlorophenoxy groups; 2,4 dichloro-1-naphthoxy polytitanyl butyrate with a 1 to 1 ratio of butyrate and 2,4 dichloro-1-naphthoxy groups; p-chlorophenylmethoxy polytitanyl oleate with 1 to 1 ratio of oleate and p-chlorophenylmethoxy groups.

The fungicides of my invention are usually incorporated with a carrier, and the composition thus formed is intimately contacted with an organic material which is subject to fungal deterioration. Intimate contact can usually be accomplished by such means as coating, impregnation, or partial impregnation.

In another aspect of the invention, the halogen containing polytitanyl acylate, or the corresponding zirconium compound may be dusted on, or mixed, with the material to be protected without resorting to the use of a carrying substance.

In a further aspect of the invention, the halogenated hydroxy aromatic compound and the starting acylate may be individually contacted with an organic material which is subject to fungal deterioration, and the new fungicide formed in situ by subjecting the mass to elevated temperatures which are sufficient to evaporate the co-product alcohol.

The preferred fungicidal agents are the pentachlorophenoxy polytitanyl stearates having the unit structure

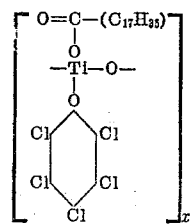

In the preferred method of this invention, the active ingredient is used with a carrier that may be either a solid, or a liquid in which the acylate may be dissolved or dispersed. The halogen containing acylate may be present in amounts ranging from 0.01% to 75% of the total composition. Suitable liquids for preparing fungicide solutions include cyclohexane, hexane, mineral spirits, kerosene, mineral oil, creosote, benzene, carbon tetrachloride, ethyl acetate, amyl acetate, furane, furfural and mixtures of these solvents. Blending agents or solubilizing agents, and other preservatives for the treated material may also be present in the solution. Preferred concentrations for purposes of this invention comprise those in which the active agent is dissolved in amounts ranging from 0.1 to 10% of the total solution. The alkoxy polytitanyl acylates and the corresponding zirconium compounds which are suitable as starting materials for the preparation of the fungicides of this invention may be used as dispersing or solubilizing agents in the solutions. Effective concentrations of these dispersants should be such that there are present in the solution from ¼ to 2 metal atoms contained in the dispersing acylate for each metal atom of the fungicide. When using fungicides and dispersants of approximately equimolecular weight per metal atom, equal weights of each material are especially satisfactory. Solutions may be applied to the organic material to be treated by spraying, brushing or by immersing the material in the solution.

When a dispersion is used, a preferred concentration of the active agent is from about 0.01% to 2% of the total composition. Although water is the preferred dispersing medium for agricultural use, any inert liquid in which the antifungal compound does not completely dissolve can be used. Well known dispersing, spreading or wetting agents, such as the sulfonated alcohols are helpful in keeping the active ingredients in fine suspension. If desired, other powdered solids may also be used in the dispersion in conjunction with the fungicide of this invention. Solutions or dispersions are usually applied to the material to be treated until the run-off point is reached. However, lesser amounts will also be effective. Suitable solid carriers for admixture with the antifungal agent comprise talc, prophyllites, natural clays, diatomaceous earths, calcium carbonate and magnesium carbonate. The amounts of the active compound or compounds of the invention which are contacted with the treated material will vary according to the purpose for which it is being used. In general, amounts ranging from .0001 to .05 gram per square inch of treated material are usually satisfactory. However, it should be understood that amounts above and below these concentrations are also effective.

For a clearer understanding of the invention, the following specific examples are given. These examples are intended to be merely illustrative of the invention and not in limitation thereof.

EXAMPLE 1

Isopropoxy polytitanyl stearate was prepared by mixing 285 grams of stearic acid and 200 ml. of cyclohexane with 285 grams of isopropyl titanate and agitating for 2 hours, to dissolve and react the acid. 15.5 grams of water dissolved in 500 grams of isopropanol were then added to the mixture. The isopropanol was then removed by distillation and vacuum stripping leaving an amber waxy residue of isopropoxy polytitanyl stearate containing 15.5% Ti. 100 grams of the isopropoxy polytitanyl stearate were dissolved in 500 grams of dry hexane. 65 grams of pentachlorophenol in 1000 grams of hexane were slowly added to the stearate solution during agitation and heating to reflux temperatures under a distilling column. A reddish color began developing upon mixing which indicated the formation of a phenoxy acylate. After the addition was completed, the distillate was taken from the column at a head temperature ranging from 61° C. to 65° C. The distillate was a hexane-isopropanol azeotrope. The distillation was continued at reduced pressure until a non-volatile orange-red residue remained which solidified on standing. The residue was soluble in cyclohexane and other hydrocarbons to a limited extent, and its analysis showed the atomic ratio of chlorine to titanium to be 5, indicating a pentachlorophenoxy polytitanyl stearate having the unit structure:

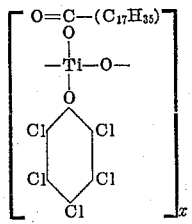

30 blocks of ponderosa pine wood 2 x 1 x ¼ inches with the grain parallel to the short dimension were brought to moisture equilibrium at room temperature and 65% relative humidity and then weighed. Ten of these blocks were treated with a high grade commercial wood preservative solution containing 1.25% by weight of pentachlorophenol and a water-proofing agent. The treatment consisted of dipping the blocks in the solution for 3 minutes, blotting off the excess solution, weighing to determine solution pick-up, and evaporating the solvent at room temperature. Another group of ten blocks was similarly treated with a 0.625% (pentachlorophenol basis) hexane solution of the pentachlorophenoxy polytitanyl stearate which also contained an equal weight of isopropoxy polytitanyl stearate as a dispersing agent. A third group of ten blocks was similarly treated with a simple mixture of the same quantities of the starting materials (pentachlorophenol and isopropoxy polytitanyl stearate), in 0.625% concentration in hexane, calculated on the pentachlorophenol content.

Each group of ten blocks was then divided into two sets of three and one set of four for durability tests.

Test No. 1: No further treatment (4 blocks)
Test No. 2: Placed in oven 24 hrs. at 70° C. (3 blocks)
Test No. 3: Leached in running water 24 hrs. 30° C. (3 blocks)

After this treatment, all 30 blocks were brought to equilibrium in a 65% RH atmosphere and weighed. All 30 blocks were then placed in Petri dishes in contact with a culture of *Lenzites trabea*, a wood destroying organism at 80° F. for 65 days. At the end of this exposure, the fungus growth was carefully removed from the surface, and the blocks brought again to 65% RH equilibrium and weighed. The percent loss in weight was taken as a measure of the wood destruction by decay. The results of these tests are shown in Table 1.

Table 1

| Group No. (10 blocks) | Agent Used | Percent Conc. of $C_6Cl_5$-OH in Soln. | Test No. | Number Blocks | Percent Loss in Weight due to decay | | |
|---|---|---|---|---|---|---|---|
| 1 | Commercial fungicide | 1.25 | 1 | 4 | 2.3 | | |
| | | | 2 | 3 | | 25.1 | |
| | | | 3 | 3 | | | 0 |
| 2 | Pentachloro-phenoxy polytitanyl stearate plus TRSTA [1] | .625 | 1 | 4 | 2.3 | | |
| | | | 2 | 3 | | 0 | |
| | | | 3 | 3 | | | 0 |
| 3 | Physical mixture of pentachlorophenol and isopropoxy polytitanyl stearate [2] | .625 | 1 | 4 | 7.6 | | |
| | | | 2 | 3 | | 4.2 | |
| | | | 3 | 3 | | | 9.6 |

[1] Equal weight of isopropoxy polytitanyl stearate added to increase solubility.
[2] Same materials present as in group 2 above, but it is a physical mixture of the starting acylate and pentachlorophenol.

The results of the above tests show that pentachlorophenoxy polytitanyl stearate is equal to or superior to the commercial product at only half the concentration. These concentrations were based on the pentachlorophenol content for purposes of comparison because it was thought that this was the most active component in the prevention of decay. The composition tested in group No. 2 of the table is outstandingly superior to the equivalent mixture of its components tested in group No. 3. It was also found to be equally superior to either of the components used alone. Untreated control blocks were also kept, and they showed much more extensive damage. The loss in weight on these blocks was from 28 to 33%.

EXAMPLE 2

A supply of pulverized or finely granulated pentachlorophenoxy polytitanyl stearate was prepared according to the method of Example 1. Since this material is a solid with wax-like characteristics, it is more easily pulverized by a chopping or cutting action than by the usual attrition grinding. This sample was prepared by simple hand chopping with a knife. Larger samples may be prepared by related mechanical devices, or the powdered material may be obtained by spray drying techniques using an organic solution of the agent. One gram of the powdered material was then suspended in 500 cc. of water and subjected to the action of high speed mixing blades for about 20 minutes. The resulting slurry or suspension was sprayed on a group of tomato plants until the run-off point was reached. These plants were then inoculated with *Alternaria solani* (early blight). A control group of untreated tomato plants was similarly inoculated, and both groups incubated at 100% relative humidity at 78° F. At the end of a suitable period, comparison showed the plants treated with the pentachlorophenoxy polytitanyl stearate had only 2% as much disease as the untreated plants. No phytotoxicity from the new fungicidal agent was noticed, although pentachlorophenol itself is too phytotoxic to be used on plants.

EXAMPLE 3

A 0.04% suspension of pentachlorophenoxy polytitanyl stearate in water was prepared according to the methods used in Example 2 and sprayed on a group of young apple trees until the run-off point was reached. Both this group of trees and an unsprayed control group were then inoculated with the *Venturia inaequalis* (apple scab). A comparison made after a suitable incubation period showed that the trees treated with the polytitanyl stearate were only three percent as diseased as the untreated trees. No phytotoxicity from this agent was observed.

From the above examples, it is apparent that the fungicides of this invention have the benefit of being suited for living as well as non-living organic materials.

The preservative compound prepared in accordance with this invention may be used for treatment of any organic material which is subject to fungal deterioration. Other materials not heretofore enumerated which could be treated by the fungicides of this invention would include trees, cotton webbing, paper products, ground wood, bagasse and other cellulosic materials. While solutions, dispersions, and powdered mixtures have been heretofore described, it is also contemplated that concentrates and pastes may be prepared, especially for storage and shipping. It should also be pointed out that this invention contemplates using a mixture of the halogen containing acylates since this obviates the necessity of separating individual compounds from the preparatory reaction mixture.

Some of the advantages of this new compound in its role as a wood preservative are evident from Table 1. In addition, the product is easier to handle because the corrosive pentachlorophenol, for example, is in a combined form thus reducing its vapor pressure and reducing its penetration into the skin. Furthermore, the chemical combining of the pentachlorophenol seems to enhance its fungicidal activity, and at the same time renders the pentachlorophenol resistant to removal from the treated substance by heat or by leaching. A further advantage is the fact that the metal-containing derivatives have greatly decreased phytotoxicity while still retaining high fungicidal activity. Still another advantage lies in the increased solubility of these fungicidal agents in common organic solvents as compared with such starting materials as pentachlorophenol.

I claim:

1. A fungicidal composition comprising an inert carrier and as the active ingredient a polymeric group IV–A metal compound in which the polymeric chain is formed by repeating $$-\overset{|}{\underset{|}{M}}O-$$

groups, where M is selected from the group consisting of Ti and Zr, said $$-\overset{|}{\underset{|}{M}}O-$$

groups having the following chemical groups connected to the metal atom: 0.1 to 1.9 acylate groups per metal atom, said acylate groups being derived from a monocarboxylic acid having from 4 to 24 carbon atoms; 0.1 to 1.9 halogenated aromatic radicals selected from the group consisting of halophenoxy, halonaphthoxy, and halogenated benzyloxy radicals; the residue of the molecule of said group IV–A metal compound being radicals selected from the group consisting of alkoxy radicals containing from 1 to 8 carbon atoms, hydroxyl radicals, and both of these radicals connected directly to the metal atom.

2. The composition of claim 1 in which the group IV–A metal is titanium.

3. The composition of claim 2 in which the acylate group is a stearate group and in which the halogenated aromatic radical is a pentachlorophenoxy radical.

4. The composition of claim 2 in which the acylate group is derived from drying oil acids.

5. An organic material subject to fungal deterioration having in intimate contact therewith a minor amount sufficient to inhibit said deterioration of a polymeric group IV–A metal compound in which the polymeric chain is formed by repeating $$-\overset{|}{\underset{|}{M}}O-$$

groups, where M is selected from the group consisting of Ti and Zr, said $$-\overset{|}{\underset{|}{M}}O-$$

groups having the following chemical groups connected to the metal atom: 0.1 to 1.9 acylate groups per metal atom, said acylate groups being derived from a monocarboxylic acid having from 4 to 24 carbon atoms; 0.1 to 1.9 halogenated aromatic radicals selected from the group consisting of halophenoxy, halonaphthoxy, and halogenated benzyloxy radicals; the residue of the molecule of said group IV–A metal compound being radicals selected from the group consisting of alkoxy radicals containing from 1 to 8 carbon atoms, hydroxyl radicals, and both of these radicals connected directly to the metal atom.

6. The composition of claim 5 in which the group IV–A meal is titanium.

7. The composition of claim 6 in which the acylate group is a stearate group and the halogenated aromatic radical is a pentachlorophenoxy radical.

8. The composition of claim 6 in which the acylate group is derived from drying oil acids.

9. A method for protecting organic materials from deterioration by fungal growth which comprises applying to said material in an amount sufficient to inhibit said deterioration a fungicidal composition containing as an essential ingredient a polymeric group IV–A metal compound in which the polymeric chain is formed by repeating $$-\overset{|}{\underset{|}{M}}O-$$

groups, where M is selected from the group consisting of Ti and Zr, said $$-\overset{|}{\underset{|}{M}}O-$$

groups having the following chemical groups connected to the metal atom: 0.1 to 1.9 acylate groups per metal atom, said acylate groups being derived from a monocarboxylic acid having from 4 to 24 carbon atoms; 0.1 to 1.9 halogenated aromatic radicals selected from the group consisting of halophenoxy, halonaphthoxy, and halogenated benzyloxy radicals; the residue of the molecule of said group IV–A metal compound being radicals selected from the group consisting of alkoxy radicals containing from 1 to 8 carbon atoms, hydroxyl radicals, and both of these radicals connected directly to the metal atom.

10. The method of claim 9 in which the group IV–A metal of the essential ingredient is titanium.

11. The method of claim 10 in which the acylate group of the essential ingredient is a stearate group and its halogenated aromatic radical is a pentachlorophenoxy radical.

12. The method of claim 10 in which the acylate group of the essential ingredient is derived from drying oil acids.

13. A method for protecting non-living organic material from deterioration by fungal growth which comprises wetting said material with a halogenated aromatic hydroxy compound selected from the group consisting of halophenols, halonaphthols and halogenated benzyl alcohols, and with a polymeric group IV–A metal compound in which the polymeric chain is formed by repeating $$-\overset{|}{\underset{|}{M}}O-$$

groups, where M is selected from the group consisting of Ti and Zr, said $$-\overset{|}{\underset{|}{M}}O-$$

groups having the following chemical groups connected to the metal atom: 0.1 to 1.9 acylate groups per metal atom, said acylate groups being derived from a monocarboxylic acid having from 4 to 24 carbon atoms; 0.1 to 1.9 alkoxy groups containing from 1 to 8 carbon atoms; the residue of said molecule being hydroxyl radicals; and then heating said material which has been wetted with the halogenated aromatic hydroxy compound and the polymeric group IV-A metal compound to a temperature sufficient to evaporate the corresponding alcohol of the alkoxy group on said acylate thereby forming the fungicide in situ.

14. The method of claim 13 in which the group IV-A metal compound is a titanium compound.

15. The method of claim 14 in which the halogenated aromatic hydroxy compound is pentachlorophenol.

16. The method of claim 15 in which the acylate group of the titanium compound is a stearate group.

17. The method of claim 15 in which the acylate group of the titanium compound is derived from drying oil acids.

References Cited in the file of this patent

UNITED STATES PATENTS 2,621,195    Haslam _____ Dec. 9, 1952

UNITED STATES PATENT OFFICE
CERTIFICATE OF CORRECTION

Patent No. 2,913,369                                    November 17, 1959

John H. Haslam

It is hereby certified that error appears in the printed specification of the above numbered patent requiring correction and that the said Letters Patent should read as corrected below.

Column 2, line 31, for "chloroesorcinol" read -- chlororesorcinol --; column 6, line 28, for "Thse" read -- These --; column 7, line 25, for "reduc-" read -- reducing --; column 8, line 19, for "meal" read -- metal --.

Signed and sealed this 3rd day of May 1960.

(SEAL)
Attest:

KARL H. AXLINE                                             ROBERT C. WATSON

Attesting Officer                                         Commissioner of Patents